(12) United States Patent
Van Acker et al.

(10) Patent No.: US 7,529,259 B2
(45) Date of Patent: May 5, 2009

(54) PHYSICAL LAYER SESSION RESOURCE BROKER

(75) Inventors: Katleen Peggie Florimond Van Acker, Berchem (BE); Radu Suciu, Ghent (BE); Tom Bostoen, Antwerp (BE); Etienne Andre Hubert Van den Bogaert, Schaarbeek (BE)

(73) Assignee: Alcatel, Paris (FR)

( * ) Notice: Subject to any disclaimer, the term of this patent is extended or adjusted under 35 U.S.C. 154(b) by 578 days.

(21) Appl. No.: 11/011,191

(22) Filed: Dec. 15, 2004

(65) Prior Publication Data
US 2005/0147122 A1 Jul. 7, 2005

(30) Foreign Application Priority Data
Jan. 6, 2004 (EP) .................. 04290017

(51) Int. Cl.
*H04L 1/00* (2006.01)
(52) U.S. Cl. .................. 370/412; 370/252; 379/229
(58) Field of Classification Search .............. 370/466, 370/229; 709/221, 224, 225
See application file for complete search history.

(56) References Cited

U.S. PATENT DOCUMENTS

| | | | | |
|---|---|---|---|---|
| 6,044,403 A * | 3/2000 | Gerszberg et al. | ........... | 709/225 |
| 6,069,947 A * | 5/2000 | Evans et al. | ........... | 379/229 |
| 6,532,241 B1 * | 3/2003 | Ferguson et al. | ........... | 370/469 |
| 6,539,425 B1 * | 3/2003 | Stevens et al. | ........... | 709/220 |
| 6,654,363 B1 * | 11/2003 | Li et al. | ........... | 370/338 |
| 6,678,535 B1 * | 1/2004 | Narayanaswami | ........... | 455/557 |
| 6,751,221 B1 * | 6/2004 | Saito et al. | ........... | 370/392 |
| 7,047,532 B1 * | 5/2006 | Connelly | ........... | 719/310 |
| 7,076,552 B2 * | 7/2006 | Mandato | ........... | 709/226 |
| 7,127,250 B2 * | 10/2006 | Gallagher et al. | ........... | 455/436 |
| 7,133,907 B2 * | 11/2006 | Carlson et al. | ........... | 709/220 |
| 7,159,040 B2 * | 1/2007 | Stehle et al. | ........... | 709/246 |
| 7,206,324 B2 * | 4/2007 | Persson et al. | ........... | 370/466 |
| 7,257,821 B2 * | 8/2007 | Wendorf et al. | ........... | 719/328 |
| 7,280,506 B2 * | 10/2007 | Lin et al. | ........... | 370/331 |
| 7,292,538 B1 * | 11/2007 | O'Rourke et al. | ........... | 370/252 |
| 7,333,432 B1 * | 2/2008 | Mor et al. | ........... | 370/230.1 |
| 2002/0032769 A1 * | 3/2002 | Barkai et al. | ........... | 709/224 |
| 2002/0062397 A1 * | 5/2002 | Chang et al. | ........... | 709/246 |
| 2002/0093984 A1 * | 7/2002 | Venters et al. | ........... | 370/468 |

(Continued)

FOREIGN PATENT DOCUMENTS

EP 0 748 142 A2 12/1996

(Continued)

OTHER PUBLICATIONS

Manvi S S et al.: "Qos Management by Mobile Agents in Multimedia Communication" Sep. 4, 2000, pp. 407-411, XP010515527.

(Continued)

*Primary Examiner*—Thong H Vu
(74) *Attorney, Agent, or Firm*—Sughrue Mion, PLLC

(57) ABSTRACT

The physical layer session resource broker (PHY SRB) according to the invention receives request from application servers (VOD SERVER, TV BRDCST SERVER, GAME SERVER, WEB SERVER) which are translated into physical layer parameter values. The physical layer parameter values are imposed on the access nodes (DSLAM) by the physical layer session resource broker (PHY SRB).

10 Claims, 1 Drawing Sheet

U.S. PATENT DOCUMENTS

| | | | |
|---|---|---|---|
| 2002/0124064 A1* | 9/2002 | Epstein et al. | 709/221 |
| 2002/0124245 A1* | 9/2002 | Maddux et al. | 717/176 |
| 2003/0028895 A1* | 2/2003 | Buehler et al. | 725/119 |
| 2003/0074554 A1* | 4/2003 | Roach et al. | 713/153 |
| 2003/0097427 A1* | 5/2003 | Parry | 709/220 |
| 2003/0126468 A1* | 7/2003 | Markham | 713/201 |
| 2003/0174729 A1* | 9/2003 | Heink et al. | 370/466 |
| 2004/0078495 A1* | 4/2004 | Mousseau et al. | 710/1 |
| 2004/0103114 A1* | 5/2004 | Sesma | 707/103 R |
| 2005/0044197 A1* | 2/2005 | Lai | 709/223 |
| 2007/0025301 A1* | 2/2007 | Petersson et al. | 370/338 |

FOREIGN PATENT DOCUMENTS

| | | |
|---|---|---|
| WO | WO 01/20946 A1 | 3/2001 |
| WO | WO 03/017585 A2 | 2/2003 |

OTHER PUBLICATIONS

Alcatel: "Alcatel 5430 SRB" 3CL 00469 0490 TQZZA ED.0.1, 'Online! 2003, pp. 1-2, XP002283965.

Nov. 2003 DSL Forum Talk in Paris (enclosed).

TIE1.4 Contribution 2003-325 dated Dec. 8-12, 2003.

T. Starr et al, DSL Advances, Prentice-Hall (2003 Edition).

George Ginis et al, "Vectored Transmission for Digital Subscriber Line Systems", IEEE JSAC special issue on twisted-pair transmission, vol. 20, Issue 5, pp. 1085-1104, Jun. 2002.

J. M. Cioffi, Chapter 4 "Generalized Decision-Feedback Equalization for Packet Transmission with ISI and Gaussian Noise" from *Communications, Control of Signal Processing: A Tribute to Thomas Kailath* (A. Paulraj et al, Ed.), Kluwer Academic Publishers, 1997.

TIE1.4 contribution 2002-069—Feb. 18, 2002.

TIE1.4 contribution 1992-203—Dec. 1, 1992.

A. Weissberger et al, "ADSL-DMT Out of Service Tests, Simplified Start-up Procedure(s), and Layer Management Protocols," Standards Project: ADSL Testing and Management, Brussels, Belgium; Sep. 16-17, 1997 (enclosed).

* cited by examiner

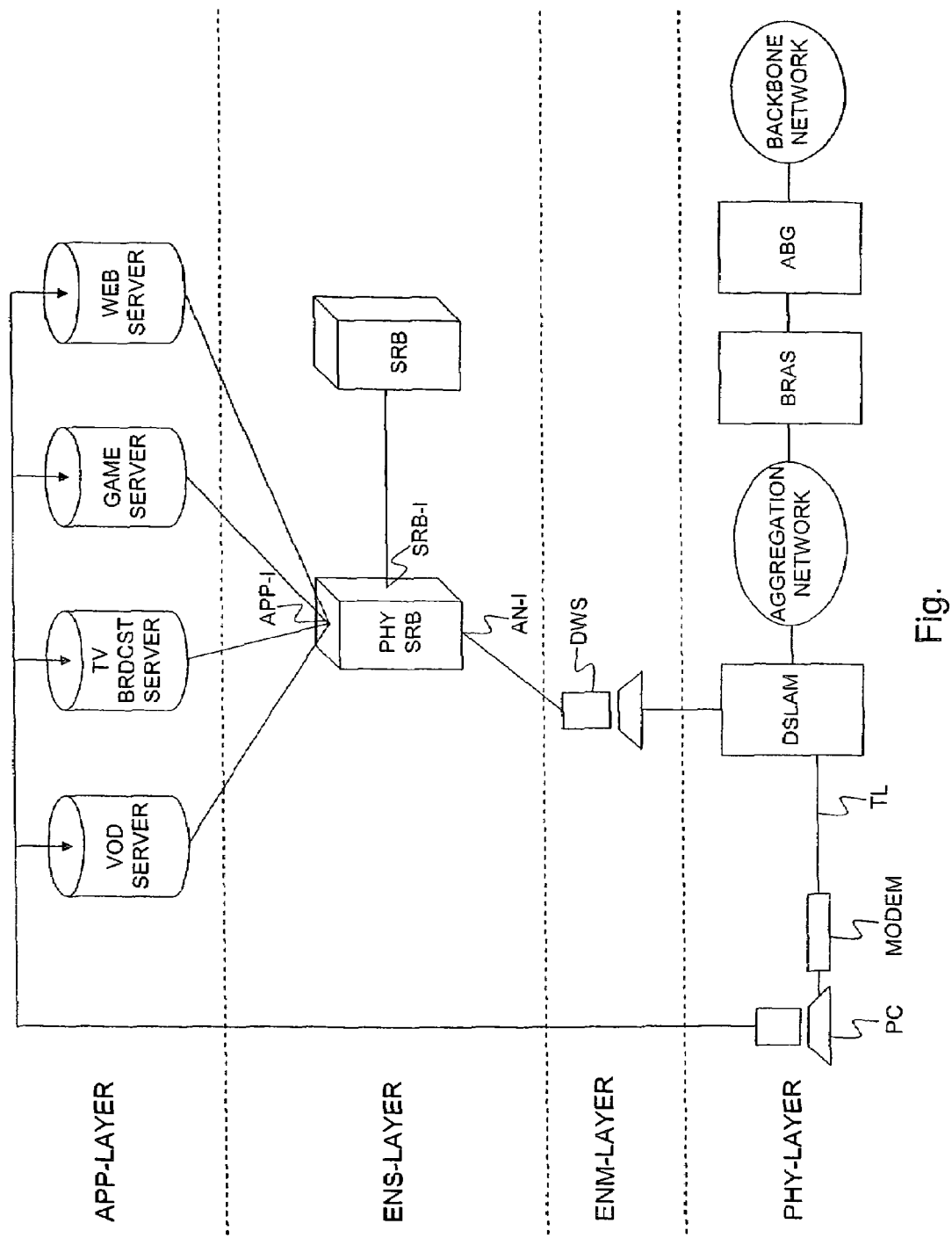
Fig.

PHYSICAL LAYER SESSION RESOURCE BROKER

The present invention relates to resource brokering in access networks which is the art of controlling and optimizing the use of resources in order to deliver different applications with the expected quality of service to the end user.

A session resource broker is already known, for instance from the Alcatel 5430 SRB product data sheet, retrievable via the Internet at the URL http://www.alcatel.com/products/productsummary.jhtml?repositoryID=/x/opgproduct/a5430srb.jhtml. The Alcatel 5430 SRB receives bandwidth requests from the application servers in a DSL (Digital Subscriber Line) access network, keeps track of the available resources in the DSL access network, controls session admission by blocking calls that require more bandwidth than available, and ensures—when admitting a session—that the application session receives an appropriate quality of service. For instance, the 5430 SRB shall select an ATM pipe with UBR quality (Unspecified Bit Rate) for surfing the web whereas it will select an ATM pipe with CBR quality (Constant Bit Rate) for a voice call over the DSL loop. The 5430 SRB is positioned as a single point of contact for all application servers requiring a certain quality of service, and has application interfaces such as a standard COPS interface and a web SOAP/XML interface for receiving bandwidth-on-demand requests from application servers like a gaming or a video-on-demand server.

A drawback of the state of the art 5430 session resource broker is that it works under constraint of given fixed physical layer resources and only optimizes the resources at higher protocol stack layers. The known session resource broker as a consequence is not able to optimize the DSL access network in order to enable higher rates for customers who are willing to pay for it.

An object of the present invention is to provide a session resource broker with increased flexibility for management of the resources in an access network, and which enables a user or an application to tailor the physical connection for its needs.

According to the present invention, this object is realized by the session resource broker defined below.

Indeed, by translating quality parameters into physical layer parameter values and imposing the physical layer parameters on the access nodes, the session resource broker according to the current invention is able to optimize the physical layer per application session, and for example optimize latency, adapt the acceptable bit error rate, optimize the physical layer resources to enable higher rates for other customers or applications, . . . The optimized physical layer parameter values can be set automatically when a user starts an application (on the basis of the application request received from the application server), or some choice can be given to the user for instance to choose the bit rate when starting a video application. In the latter situation, the user request is expected to be converted at the application layer into an application request that is sent to the application interface of the session resource broker according to the present invention.

It is noted that the terms "comprising" or "comprised", used in the claims, should not be interpreted as being limitative to the means or steps listed thereafter. Thus, the scope of the expression 'a device comprising means A and B' should not be limited to devices consisting only of components A and B. It means that with respect to the present invention, the only relevant components of the device are A and B.

Similarly, it is to be noticed that the terms "coupled" or "coupling", also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

Additional, optional features of the session resource broker according to the present invention.

This way, a more stable video link can be established for real-time video delivery for example by increasing the target noise margin or decreasing the minimum margin below which showtime will be interrupted. Signaling can be provided in order to inform the user that the connection can be interrupted whenever the margin is approaching the minimum margin as a consequence of which loss of showtime becomes imminent. Such a stable video link is interesting for live video or TV broadcast sessions where the user desires to minimize the chances for loss of showtime which is frustrating when watching live feeds such as a sports game. The increase in target noise margin comes at the expense of the attainable bitrate. The decrease of minimum margin results in a possible higher bit error rate.

Other optional features of the session resource broker according to the present invention.

A video on demand session, which is typically not sensitive to delays but requires a good quality of the watched movie, translates into requirements for less bit errors which can be imposed on the physical layer by the session resource broker according to the current invention.

Further optional features of the session resource broker according to the current invention.

Indeed, an ADSL modem for instance has an interleaved mode wherein errors are reduced but delay increases, and a fast mode with less error protection but decreased delay. For e-game applications, the interleaved mode has a negative impact on the quality perception of playing games, so switching to the fast mode on instruction of the invented session resource broker at the start of an e-game session, will improve satisfaction of gamers.

Yet another optional feature of the session resource broker according to the present invention.

The session resource broker according to our invention enables to switch for instance from an asymmetric DSL link towards a more symmetric link for users that require more upstream bandwidth for instance because they have a frequently consulted web server.

A further optional feature of the session resource broker according to the present invention.

The invented session resource broker impacting the physical layer can work together with a different session resource broker like the Alcatel 5430 SRB impacting the higher layers of the protocol stack to obtain even better results in terms of resource control and management in the access network. Both the physical layer session resource broker and the higher layer session resource broker could constitute separate boxes or modules in the network, or alternatively could be integrated into a single box.

The above mentioned and other objects and features of the invention will become more apparent and the invention itself will be best understood by referring to the following description of an embodiment taken in conjunction with the accompanying drawing (FIGURE) which depicts the different protocol stack layers of a DSL (Digital Subscriber Line) access network that contains an embodiment of the session resource broker PHY SRB according to the present invention.

The drawing FIGURE shows the network elements that play a role at the physical layer PHY-LAYER, element and network management layer ENM-LAYER, element and network service layer ENS-LAYER and application layer APP-LAYER of a sample DSL access network wherein the current invention is implemented.

At the viewpoint of the physical layer PHY-LAYER, users are connected via their personal computer PC and DSL modem MODEM over copper twisted pair telephone wiring TL to the DSL access multiplexer DSLAM. Eventually, multiple PCs interconnected via the home network share a single DSL connection towards the DSLAM. The access multiplexer DSLAM is the port towards for instance an ATM aggregation network (AGGREGATION NETWORK in FIGURE), whereto also one or more broadband access servers BRAS may be connected. The broadband access server BRAS is coupled via the access border gate ABG to for instance an IP or MPLS based over-provisioned backbone network (BACKBONE NETWORK in FIGURE). All access multiplexers from a single DSL operator may be managed by a single DSL work station DWS, which is an element management platform operational at the element and network management layer ENM-LAYER. At the application layer APP-LAYER, a number of servers like a Video-on-Demand server VOD SERVER, a live video broadcast server TV BRDCST SERVER, a e-game server GAME SERVER and an Internet server WEB SERVER are configured to receive user request from the different users, and further are connected to the application interface APP-I of a physical layer session resource broker PHY SRB. This physical layer session resource broker PHY SRB further is connected via its access node interface AN-I to the DSL work station DWS, and via its resource broker interface SRB-I to a session resource broker SRB that is impacting protocol layers higher than the physical layer. The latter session resource broker SRB also has interfaces towards the different servers VOD SERVER, TV BRDCST SERVER, GAME SERVER and WEB SERVER, as well as to various network nodes like DSLAM, BRAS and ABG, but these interfaces and the corresponding signaling links are not drawn in FIGURE to avoid overloading the FIGURE.

The various applications for the end user have contradictory requirements. Gaming for example requires small latency to satisfy the user, while being relaxed about error probabilities. Gamers using an ADSL (Asymmetric Digital Subscriber Line) therefore have the feeling that interleaving has a negative impact on their quality perception when playing games. When launching an e-game in the network depicted in FIGURE, the e-game server GAME SERVER therefore request the physical layer session resource broker PHY SRB for a low latency link which will be translated by the physical layer session resource broker PHY SRB into a request to switch from interleaved towards fast mode. The physical layer session resource broker PHY SRB will issue an instruction for the access multiplexer DSLAM and modem MODEM to switch towards fast mode and sends this instruction towards the DSL work station DWS in order to be imposed thereby on the physical layer PHY LAYER. The physical layer session resource broker PHY SRB may further communicate with the session resource broker SRB for example to learn if the required bandwidth is available, to be informed on the admission/rejection of the game session, or to request if the DSL line can be switched from interleaved to fast mode as this may have an impact on other applications using the DSL line as switching to the fast mode deprives the DSL connection of its robustness against burst errors (no protective interleaving anymore).

Alternately, the loss of showtime in DSL modems when external noise exceeds a certain threshold (a phenomenon that occurs in particular for users that are placed in less favorable conditions like the neighborhood of a strong disturber, bad telephone wires, long loops to the central office, etc.) is frustrating when watching a live video stream like a football game. Therefore, the user knowing that he/she is prone to loss of showtimes, can ask the video broadcast server TV BRDCST SERVER in FIGURE for a stable link. The video broadcast server TV BRDCST SERVER will forward the stable link request to the physical layer session resource broker PHY SRB which will translate this request into an instruction for the DSLAM for example to increase the target noise margin or to reduce the minimum margin. The reduced minimum margin allows the DSLAM to drop the connection only when the margin falls below this reduced minimum margin, thus reducing the chances for loss of showtime once the user is watching the live video feed. If the margin nevertheless drops down to a level approaching the reduced minimum margin, the physical layer session resource broker PHY SRB will signal to the user that his connection can get interrupted. A message may show up on the user's PC screen for instance. The decrease of minimum margin results in a possible higher bit error rate. The increase in target margin comes at the expense of attainable bitrate on the ADSL connection as the user's power spectral density remains constant. Another example situation is where the user launches a video-on-demand session at the video-on-demand server VOD SERVER. The user expects to watch a high quality image and therefore the video-on-demand server VOD SERVER issues a request for good quality of the link whereover the movie will be transferred to the physical layer session resource broker PHY SRB. The physical layer session resource broker translates the request for a qualitative link coming from the VOD SERVER into a low bit error rate (BER), and instructs the DSL work station DWS to impose the reduced BER on the DSLAM.

Yet another example situation is where the user both accesses/downloads information from the web and simultaneously puts information accessible or downloadable via the web. The web server WEB SERVER controlling such service at the application level will request the physical layer session resource broker PHY SRB for a more symmetric link, which will be translated by the physical layer session resource broker into re-assignment of the DMT (Discrete Multi Tone) carriers to the downstream and upstream directions in order to change the share in upstream/downstream bandwidth on the DSL connection. Again the physical layer session resource broker PHY SRB will instruct the DSL modem MODEM and DSL access multiplexer DSLAM to change the physical layer settings in order to comply with the new upstream and downstream bandwidth assignment.

In the above described examples, the application itself —i.e. the highest layer in the functional stack—is triggering the physical layer session resource broker PHY SRB. Although less likely, it is noted however that variant implementations of the physical layer session resource broker PHY SRB may be triggered by a service enabler (spy, snooper or sniffer) for example in the access multiplexer DSLAM.

It is further noticed that the physical layer adaptations required by the physical layer session resource broker PHY SRB may be adopted with or without interruption of the connection. A change in bitrate for instance could be seamlessly applied during showtime, whereas a switch between asymmetric and symmetric modes might require retrain or even re-initialization of the DSL connection.

The above description of applications, quality parameters and physical layer parameters tunable by the physical layer session resource broker PHY SRB were only given by way of example. The person skilled in telecommunications will understand that the basic principle of this invention, i.e. to provide a session resource broker which on request of applications adjusts physical layer parameters in an access network, is far more extendible. Other applications than the one shown in FIG. 1 for instance are voice over DSL, TCP sessions, etc. Typical quality parameters may be the delay, jitter, attainable bit rate, bit error rate, etc. Typical tunable physical layer parameters are the data rate, the degree of upstream/downstream symmetry, the interleaver depth, the maximum acceptable bit error rate, the noise margin(target, max. additional and minimum), etc.

Although reference was made above to DSL (Digital Subscriber Line) or ADSL (Asymmetric Digital Subscriber Line) technology used for transmission over twisted pair telephone lines, any skilled person will appreciate that the present invention can be applied with same advantages in other DSL (Digital Subscriber Line) systems such as VDSL (Very High Speed Digital Subscriber Line), SDSL (Synchronous Digital Subscriber Line) systems, HDSL (High Speed Digital Subscriber Line) systems, and the like, or in radio based access systems (like GSM, GPRS, UMTS or LMDS networks), or even in cable based or fiber based access systems. In particular for wireless access networks where the quality and stability of connections does not always suit the application requirements, might the integration of a physical layer session resource broker that optimizes the physical layer parameters each time an application is launched be an attractive idea. Other types of networks where the invention can be used, for instance are PLC (powerline communication networks), grid computing networks (storage and computing power farms will have to play with computing power, RAM memory, swap space, disk space, . . . in function of user demand and subscription type), RFID networks (where RF tags are disposed on goods to track them and prevent stealing. In case one knows something is missing, maybe the tracking network can be optimised to focus on the kind of products that are missing), Power over Ethernet networks, Power over wireless networks, etc.

Furthermore, it is remarked that an embodiment of the present invention is described above rather in functional terms. From the functional description, it will be obvious for a person skilled in the art of designing hardware and/or software solutions for multi-carrier communications systems how embodiments of the invention can be manufactured.

While the principles of the invention have been described above in connection with specific apparatus, it is to be clearly understood that this description is made only by way of example and not as a limitation on the scope of the claims.

The invention claimed is:

1. A session resource broker for customizing resources for an application session in an access network, said session resource broker comprising:
an application interface for reception of at least one application request from at least one application server coupled to said application interface,
wherein said session resource broker further comprises:
a translator for translating a quality parameter value in one of said application requests into a physical layer parameter value; and
an access node interface for transferring said physical layer parameter value to an access node for adoption thereby as a physical layer parameter of a physical layer connection between said access node and a device of said application session corresponding to said application request.

2. A session resource broker according to claim 1, wherein said physical layer parameter value is indicative for a level below which showtime will be interrupted.

3. A session resource broker according to claim 2, wherein said session resource broker further comprises notification means for notifying a user on expected loss of showtime.

4. A session resource broker according to claim 2, wherein said application server is a video broadcast server, and said quality parameter value is indicative for a required stability.

5. A session resource broker according to claim 1, wherein said physical layer parameter value is indicative for a minimal bit error rate.

6. A session resource broker according to claim 5, wherein said application server is a video on demand server, and said quality parameter value is indicative for an expected image quality.

7. A session resource broker according to claim 1, wherein said physical layer parameter value is indicative for the selection of fast mode instead of interleaved mode.

8. A session resource broker according to claim 7, wherein said application server is a game server, and said quality parameter value is indicative for an expected play reaction time.

9. A session resource broker according to claim 1, wherein said physical layer parameter value is indicative for the capacity share between upstream and downstream direction.

10. A session resource broker according to claim 1, wherein said session resource broker further comprises a broker interface for connection to a second session resource broker able to customize resources at protocol stack layers higher than the physical layer on the basis of bandwidth requests received from said at least one application server.

* * * * *